US011277475B1

United States Patent
Tal et al.

(10) Patent No.: US 11,277,475 B1
(45) Date of Patent: *Mar. 15, 2022

(54) AUTOMATIC DISCOVERY OF STORAGE CLUSTER

(71) Applicant: ServiceNow, Inc., Santa Clara, CA (US)

(72) Inventors: Hail Tal, Petah Tikva (IL); Abhishek Kumar, Bangalore (IN); Manish S. V. Kumar, Bangalore (IN); Aditya Kumar, Bangalore (IN); Purvi Dayabhai Pipaliya, Bangalore (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/335,467

(22) Filed: Jun. 1, 2021

(51) Int. Cl.
  *G06F 15/16* (2006.01)
  *H04L 67/1097* (2022.01)
  (Continued)

(52) U.S. Cl.
  CPC .......... *H04L 67/1097* (2013.01); *G06F 9/541* (2013.01); *H04L 41/0253* (2013.01)

(58) Field of Classification Search
  CPC .. H04L 67/1097; H04L 41/0253; G06F 9/541
  (Continued)

(56) References Cited

U.S. PATENT DOCUMENTS

| | | |
|---|---|---|
| 4,941,084 A | 7/1990 | Terada et al. |
| 5,185,860 A | 2/1993 | Wu |

(Continued)

FOREIGN PATENT DOCUMENTS

| | | |
|---|---|---|
| EP | 0433979 | 6/1991 |
| EP | 1607824 | 12/2005 |

(Continued)

OTHER PUBLICATIONS

SANDataWorks, NetApp SolidFire All-Flash Array, https://www.sandataworks.com/SolidFire.asp, printed from the World Wide Web May 22, 2021.

(Continued)

*Primary Examiner* — Liang Che A Wang
(74) *Attorney, Agent, or Firm* — McDonnell Boehnen Hulbert & Berghoff LLP

(57) ABSTRACT

A computing system for automatic discovery of a storage cluster. A computing system includes a discovery server, which receives a user-input including authentication credentials associated with a storage cluster. The discovery server executes a discovery pattern comprising a sequence of operations for a discovery of a set of resources associated with the storage cluster, based on the received user-input. One of the sequence of operations may correspond to transmission of a plurality of Application Programming Interface (API) calls to an Internet Protocol (IP) address of the storage cluster. The discovery server further receives a plurality of responses from the storage cluster. The plurality of responses includes information associated with the set of resources. The discovery server further generates a dependency map between the set of resources associated with the storage cluster based on the received information and outputs the generated dependency map.

18 Claims, 5 Drawing Sheets

(58) Field of Classification Search
USPC .................................... 709/203, 219, 223
See application file for complete search history.

(56) References Cited

U.S. PATENT DOCUMENTS

| | | | |
|---|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 10,673,963 B1 | 6/2020 | Feiguine et al. |
| 10,749,943 B1 | 8/2020 | Feiguine et al. |
| 10,771,344 B2 | 9/2020 | Bitterfeld et al. |
| 10,810,055 B1 * | 10/2020 | Walker .................. G06F 9/5005 |
| 10,824,650 B2 | 11/2020 | Bar Oz et al. |
| 10,944,654 B2 | 3/2021 | Rimar et al. |
| 11,095,506 B1 * | 8/2021 | Erblat ................. H04L 41/5058 |
| 11,113,090 B1 * | 9/2021 | Wilkinson ............ G06F 9/5077 |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2012/0311157 A1 * | 12/2012 | Erickson ................ G06F 9/541 709/226 |
| 2017/0093640 A1 * | 3/2017 | Subramanian .......... H04L 67/16 |
| 2018/0123940 A1 | 5/2018 | Rimar et al. |
| 2018/0278496 A1 * | 9/2018 | Kulshreshtha ........ H04L 41/145 |
| 2018/0322558 A1 * | 11/2018 | Padmanabh ....... G06Q 30/0623 |
| 2019/0052531 A1 * | 2/2019 | Sividia ................ H04L 41/0873 |
| 2019/0104398 A1 | 4/2019 | Owen et al. |
| 2019/0123983 A1 * | 4/2019 | Rao ..................... H04L 41/0893 |
| 2019/0123985 A1 * | 4/2019 | Rao ........................ H04L 41/14 |
| 2019/0173736 A1 * | 6/2019 | Ponnuswamy ....... H04L 41/145 |
| 2020/0050689 A1 | 2/2020 | Tai et al. |
| 2020/0204443 A1 | 6/2020 | Bar Oz et al. |
| 2020/0314191 A1 * | 10/2020 | Madhavan .......... H04L 41/0853 |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

OTHER PUBLICATIONS

SolidFire, "SolidFire Element 8.4 API Reference Guide," Element OS, Mar. 7, 2016.

* cited by examiner

AUTOMATIC DISCOVERY OF STORAGE CLUSTER

FIELD

Various embodiments of the disclosure relate to a storage cluster discovery. More specifically, various embodiments of the disclosure relate to a system and method for discovery of a storage cluster.

BACKGROUND

Advancement in field of networking has led to development of storage clusters. In general, a storage cluster refers to a set of resources (say storage servers) that are connected on a network and work together to store data and increase performance, capacity, or reliability of the stored data. The storage cluster distributes workloads to each resource of the set of resources, manages the transfer of workload between the set of resources, and provides access to the stored data from any resource regardless of a physical location of the data. The storage cluster is presented as a single storage system for use by external clients and is managed as a single entity through a software user interface (UI), application programming interfaces (APIs) and/or other management tools.

Traditional methods of discovering the storage cluster uses management software(s), embedded provider(s), or agent(s). However, the discovery of the storage cluster using the management software(s), the embedded provider(s), or the agent(s) have their own limitations. For example, the discovery of the storage cluster using the management software(s) requires installation on the management software(s) on the storage server of the storage cluster and a discovery system has to discover (or support) the management software(s) initially. In case the storage server doesn't support installation of the management software(s) or if the discovery system is not able to discover the management software(s), the storage cluster may not be discovered.

In case of embedded provider(s) like the Storage Management Initiative-Specification (SMI-S) provider, the limitation is that every storage server (for example a new server) does not support the SMI-S agent. Therefore, the storage cluster that support the SMI-S agent executing on the storage server are discovered using this method, but the storage cluster that doesn't support the SMI-S agent are not discovered. Another traditional method of discovering the storage cluster is using agent(s) such as the Simple Network Management Protocol (SNMP) agent. The SNMP agent may tend to have certain network problems (such as the agent is down or there are some timeout issues in the responses during discovery). Moreover, the responses received by the discovery system while discovering using the SNMP agents may contain limited information. Hence, to discover the storage cluster using the agent(s) can by time-consuming and cumbersome. With the advancement in the storage clusters, many organizations, and individuals tend to use such storage clusters to increase performance, redundancy and/or reliability, etc. Therefore, there is a need for the discover system that can quickly and efficiently discover the storage cluster.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for automatic discovery of storage cluster is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
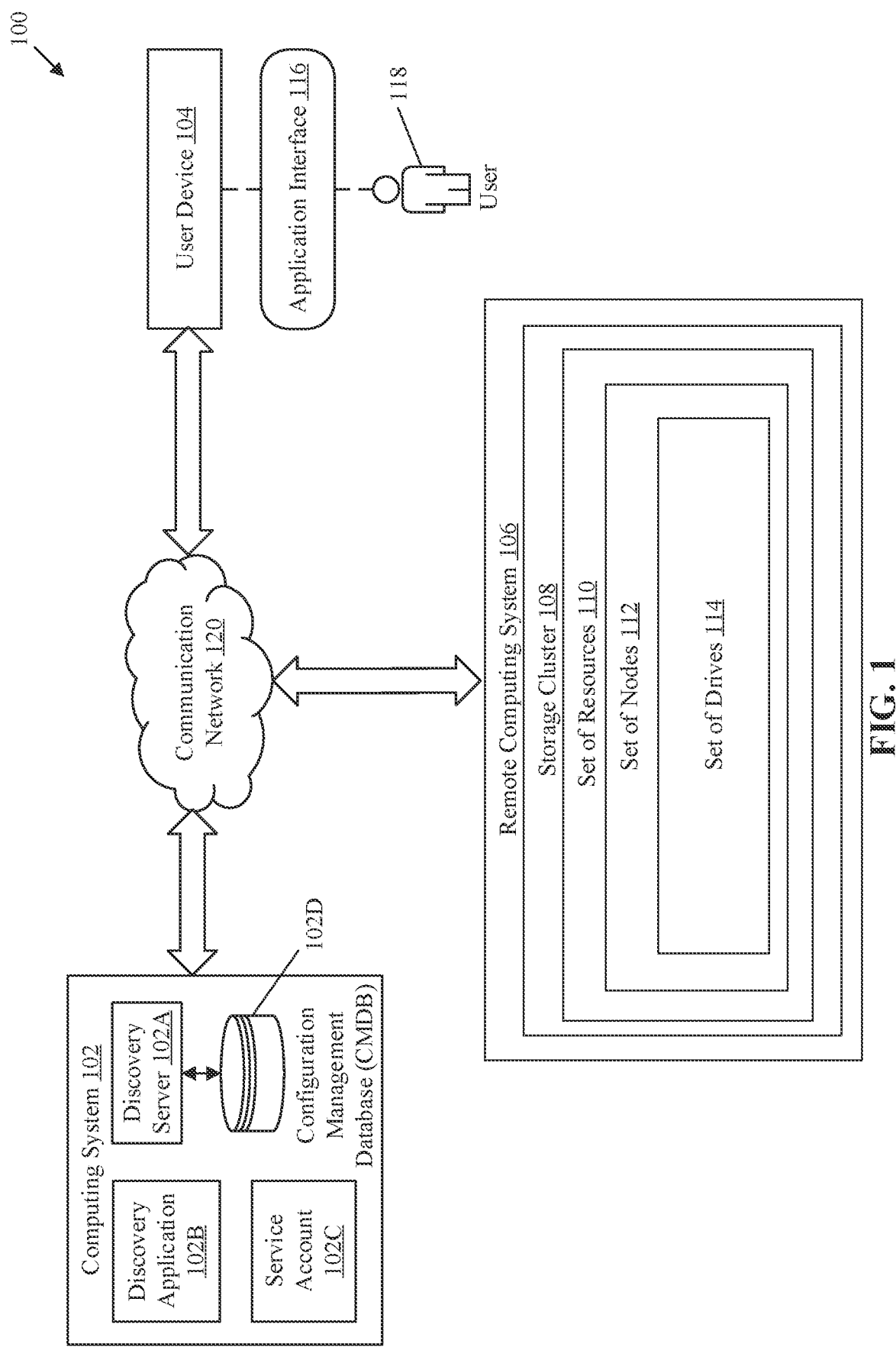
FIG. 1 is a diagram of an exemplary network environment for automatic discovery of storage cluster, in accordance with an embodiment of the disclosure.

The following described implementations may be found in the disclosed system and method for an automatic discovery of storage cluster (such as SolidFire® Storage cluster). A discovery application may be hosted on a discovery server and may be configured to discover the storage cluster that may be deployed in a remote computing system (such as SolidFire® Cloud Storage). To discover the storage cluster in the remote computing system, the discovery application may be configured to call external Application Programming Interfaces (APIs) components of the remote computing system to determine a presence, components, and attributes of the storage cluster in different regions and availability zones.

The remote computing system may also provide services to host, deploy, and manage storage clusters in the remote computing system. The storage cluster may include, but not limited to, a set of resources that may further include, but is not limited to, a set of nodes. The set of nodes may further include a set of drives. The storage cluster may be managed by a cluster resource manager (such as NetApp® Element Software). The cluster resource manager may execute independently on each node and may be responsible for providing maximum availability performance, and/or reliability of the stored data. In an embodiment, the cluster resource manager may be further responsible for detection of drive-level failures in the storage cluster and for appropriate recovering of drive-level information.

Due to dynamic nature of an organization, the organization may have multiple storage clusters that may be hosted in the remote computing system. Each of the multiple storage clusters may provide a specific service and/or resources to employees of the organization and/or to customers of the organization. The high availability of the storage cluster services may be crucial for overall operations within the organization as well as for the credibility of the customers. Therefore, there is a need to automatically detect and/or discover each storage cluster of the multiple storage clusters associated with the organization. More specifically, there is a need to further discover and map the storage cluster, the set of nodes in the storage cluster, and the set of drives of the storage cluster.

Exemplary aspects of the disclosure provide a computing system that may include a discovery server. The discovery server may receive a user-input from an application interface of a user device. The user-input may include authentication credentials associated with a storage cluster. The discovery server may execute a discovery pattern based on the received user-input. The discovery pattern may include sequence of operations for a discovery of a set of resources associated with the storage cluster. At least one operation of the sequence of operations may correspond to transmission of a plurality of application programming interface (API) calls to an Internet Protocol (IP) address of the storage cluster. The discovery server may receive a plurality of responses from the storage cluster based on the transmitted plurality of API calls. The received plurality of responses may include information associated with the set of resources. The discovery server may generate a dependency map between the set of resources associated with the storage cluster based on the received information and further output the generated dependency map.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized, and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways. Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

FIG. 1 is a diagram of an exemplary network environment for automatic discovery of storage cluster, in accordance with an embodiment of the disclosure. With reference to FIG. 1, there is shown a block diagram of a network environment 100. The network environment 100 may include a computing system 102, a user device 104, and a remote computing system 106. The computing system 102 may include a discovery server 102A, a discovery application 102B, a service account 102C, and a configuration management database (CMDB) 102D.

As shown in FIG. 1, the remote computing system 106 may include a storage cluster 108. The storage cluster 108 may include a set of resources 110. The set of resources 110 may further include a set of nodes 112. The set of nodes 112 may include a set of drives 114. The user device 104 may host an application interface 116, through which a user 118 may provide input(s) to the discovery server 102A. In an embodiment, the user 118 may be an Information Technology (IT) administrator or a power user who may be tasked with monitoring, management, or administration of the storage cluster 108. The computing system 102 may be configured to communicate with the discovery server 102A, the remote computing system 106, and the user device 104, through a communication network 120.

The computing system 102 may include suitable code, logic, circuitry and/or interfaces that may be configured to discover the storage cluster 108 in the remote computing system 106 and maintain the CMDB 102D. The computing system 102 may host the discovery server 102A and the discovery application 102B. Further, the computing system 102 may maintain the Service Account 102C. For example, based on authentication credentials for the storage cluster 108 that may be stored in the Service Account 102C, the computing system 102 may execute a discovery pattern for the discovery of the storage cluster 108. The discovery pattern may be executed by the discovery server 102A or the discovery application 102B. The discovery pattern may be referred to as a sequence of operations, which may allow the discovery server 102A (and the discovery application 102B) to determine configuration items (CIs) to be updated based on discovered or collected information of the storage cluster 108 and further populate the determined CIs in the CMDB 102D. The computing system 102 may be configured to store the collected information related to the storage cluster 108, which may be received in response to the execution of the discovery pattern, in the CMDB 102D. Example implementations of the computing system 102 may include, but are not limited to, an application server, a database server, a mainframe server, a cloud server (e.g., a hybrid, a private, or a public cloud), or a web server.

The discovery server 102A may include code, logic, circuitry, and/or interfaces that may be configured to facilitate communication and movement of data between the application interface 116 (i.e., an instance) and external applications, data sources, and services. Multiple discovery servers, capable of handling thousands of devices each, may be deployed in different network segments to provide virtually unlimited scalability. The discovery server 102A may be configured to execute the one or more discovery patterns (i.e. a sequence of operations for discovery of the set of resources) for the discovery application 102B and return results/response back to an associated instance for processing. In an embodiment, the discovery server 102A may be configured to store the results including information associated with the discovered storage cluster 108 in one or more configuration items (CIs) in the CMDB 102D, for the discovery application 102B. In some instances, the discovery server 102A may use secure communication protocols (like HTTP-secure) to ensure all communications may be secure and initiated inside an enterprise's firewall. The discovery server 102A may be implemented as an application (such as a Java application), which may run as a service or daemon on a server or a cluster node of the computing system 102.

The discovery application 102B may include code, logic, circuitry, and/or interfaces that may be configured to make use of the discovery server 102A (also referred to as Management, Instrumentation, and Discovery (MID) Server) to discover and collect information associated with the storage cluster 108. For example, the discovery application 102B may receive a user-input through the application interface 116 (i.e. an instance) on the user device 104. The user-input may include the authentication credentials associated with the storage cluster 108 in the remote computing system 106. In an embodiment, the user-input may further include an internet protocol (IP) address associated with the storage cluster 108. The authentication credentials and the IP address may be stored in the Service Account 102C. In an embodiment, through the discovery server 102A, the discovery application 102B may be configured to discover storage cluster 108 and the set of resources 110 within the storage cluster 108. The discovery application 102B may execute the discovery pattern including the sequence of operations based on the user-input. At least one of the sequence of operations may correspond to transmission of a plurality of Application Programming Interface (API) calls to the IP address of the storage cluster 108. The discovery application 102B may receive a plurality of responses for the plurality of API calls from the storage cluster 108. The plurality of responses may include information associated with the set of resources 110. The discovery application 102B may perform the communications (e.g., the transmission of the plurality of API calls and the reception of the plurality of responses) with the storage cluster 108 through the discovery server 102A. The discovery application 102B may update the one or more CIs associated with the discovered storage cluster 108 in the CMDB 102D (stored on the computing system 102). Herein, the configuration items may correspond to, but are not limited to, physical devices, virtual devices, applications, and services associated with the storage cluster 108. In some embodiments, the discovery application 102B may be implemented as an agentless application, so that it may avoid the management complexity of having a permanent software installed on any computer, or device to be discovered.

The Service Account 102C may include code, logic, circuitry, and/or interfaces that may be configured to store credentials (such as the authentication credentials) required to access the storage cluster 108. The user 118 may be required to create the Service Account 102C for the storage cluster 108 before execution of the discovery pattern on the storage cluster 108. Example implementations of the Service Account 102C may include, but are not limited to, a relational database (RDB), a comma separated values (CSV) file, or a set of JavaScript Object Notation (JSON) key value pairs.

The CMDB 102D may include code, logic, circuitry, and/or interfaces that may be configured to store information about the storage cluster 108. The stored information may also include information about the set of resources 110 (such as the set nodes 112 and the set of drives 114). The CMDB 102D may be a database in which the information for each node of the set of nodes 112 and each drive of the set of drives 114 may be stored in a configuration item (CI) specific to the corresponding node and the corresponding drive. The discovery application 102B, through the discovery server 102A, may collect the information associated with the storage cluster 108, and may update the respective CIs in the CMDB 102D. Example implementations of the CMDB 102D may include, but not limited to, a database server, a file server, a mainframe server, a cloud server, a storage device (e.g., a Redundant Array of Independent Disks (RAID) device), or any other computing device with data storage capability.

The user device 104 may host the application interface 116 (i.e. an instance) that may be configured to receive a user-input (such as from a discovery administrator). The user device 104 may be configured to receive, from the user 118, the user-input associated with the discovery of the storage cluster 108. After the discovery is performed, the user device 104 may be further configured to display a result of the discovery of the set of resources 110 on a display device (not shown) of the user device 104, through the application interface 116. Examples of the user device 104 may include, but are not limited to, a workstation, a server, a cluster of servers with a management panel, a laptop, a tablet, an internet-enabled device, a desktop computer, a mobile phone, or any portable or non-portable device with a networking and display capability.

The remote computing system 106 may include suitable logic, circuitry, and interfaces that may be configured to provide computing resources on behalf of the user 118. These computing resources may be hosted on physical hardware and may include, but not limited to, one or more storage servers, one or more load balancers, and one or more virtual machines distributed across one or more availability zones (e.g., datacenters) that may be disposed within one or more geographic regions. These and other computing resources (if any) may collectively define a cloud-based computing environment that may allow the user 118 to deploy storage clusters, host software application(s), resource clusters, and otherwise utilize the computing resources. The cloud-based computing environment may be provided atop an infrastructure of various computing resources that allow the computing environment to be defined, modified, and otherwise tailored according to the needs of the user 118. In some embodiments, the remote computing system 106 may correspond to a cloud network.

The storage cluster 108 may be a hub of a storage system and may include the set of resources 110 that may further include the set of nodes 112. Each node of the set of nodes 112 may include the set of drives 114. The storage cluster 108 may appear and may be accessed as a single logical unit on a network and may be accessed as block storage. The storage cluster 108 may be include a minimum number of nodes. By way of example and not limitation, the SolidFire® storage cluster 108 may include a minimum of 4 nodes. The storage cluster 108 may have a unique virtual IP address that may be used by the user 118 to access the storage cluster 108. In an embodiment, the storage cluster 108 may also have a management virtual IP (mvip) address that may be used by the user 118 to manage the storage cluster 108. These virtual IP addresses may enable consistent connections to the storage cluster 108 regardless of the size or makeup of storage cluster 108.

Each node of the set of nodes 112 may include suitable logic, circuitry, and interfaces that may be configured to store the data to achieve the maximum availability of the data. Each node of the set of nodes 112 may be an individual physical hardware component that may be grouped into the storage cluster 108 to be access as a block storage. In an embodiment, each of the set of storage nodes 112 may be a server that contains the set of drives 114 that may communicate with each other through a network interface. One or more new nodes may be added to the storage cluster 108 to increase the capacity of the storage cluster 108. Each node of the set of nodes 112 may has a unique name and an IP address.

Each drive of the set of drives 114 may include suitable logic, circuitry, and interfaces that may be configured to store a portion of the data for the storage cluster 108. Each drive of the set of drives 114 may be a physical drive and may be either a volume metadata drive or a block drive. The volume metadata drive may store compressed information that defines each volume, clone, snapshot, or other objects within the storage cluster 108. The volume metadata drive may store data redundantly across the storage cluster 108. The block drive may store the compressed, de-duplicated data blocks. Each block drive may act as an individual hard drive that may be configured by the storage administrator. In the block drives, data may be saved to the drives in fixed-sized chunks called blocks and each block may be associated with a unique address. The majority of read requests for data already stored on the storage cluster 108, as well as requests to write data, may occur on the block drives. The total block drive capacity in the storage cluster 108 may determine the maximum amount of data that can be stored, considering the effects of compression, thin provisioning, and de-duplication.

The application interface 116 (also referred to as an Instance) may be implemented as a client-side application for a specific group of users who may access the application interface 116 through a web client (such as a web browser) and a URL which may be customizable for the group of users. The application interface 116 may host several applications and services, one or more of which may be associated with the discovery of the storage cluster 108. The application interface 116 may support role-based access to different applications or services on the application interface 116. For example, one of the group of users may be a discovery administrator who may be allowed to configure a discovery schedule for a discovery of storage cluster 108.

The communication network 120 may represent a portion of the global Internet. However, the communication network 120 may alternatively represent different types of network, such as a private wide-area or local-area packet-switched networks. The communication network 120 may include a communication medium through which the computing system 102, the user device 104, and the remote computing system 106 may communicate with each other. The communication network 120 may be one of a wired connection or a wireless connection Examples of the communication network 120 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 120 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT)® communication protocols.

In operation, the discovery server 102A may receive a discovery request via the application interface 116 of the user device 104 associated with the user 118. The discovery request may correspond to a request for discovery of a SolidFire® storage cluster (such as the storage cluster 108). Specifically, the discovery request may correspond to the request for discovery of the set of nodes 112, and the set of drives 114 included in the set of resources 110 of the storage cluster 108. The discovery server 102A may be configured to control the application interface 116 of the user device 104 to display a plurality of User interface (UI) elements. The discovery server 102A may further control the application interface 116 (i.e. via the displayed plurality of UI elements) to display a message for the user 118 to provide authentication credentials to access the storage cluster 108.

The discovery server 102A may be configured to receive a user-input via the plurality of UI elements displayed on the application interface 116 of the user device 104. The user-input may include, but not limited to, the authentication credentials that may be associated with the storage cluster 108 and the IP address of the storage cluster 108. The authentication credentials may correspond to cluster admin credentials for the storage cluster 108 (for example Solid-Fire® storage cluster), and the IP address of the storage cluster 108 may correspond to the management virtual IP address of the storage cluster 108. In an embodiment, the received authentication credentials may include a username and password to access the storage cluster 108. The authentication credentials may be associated with a set of permissions. Each of the set of permissions may be an access permission that may be associated with the authentication credentials. By way of example and not limitation, for the SolidFire® storage cluster, the set of permissions may include read access, cluster-admin access, reporting access, and drives access. In an embodiment, the authentication credentials with the first set of permissions may be stored as basic authentication credentials. The basic authentication credentials may be required for authentication of at least one of the transmitted plurality of API calls to the IP address of the storage cluster 108.

The discovery server 102A may be further configured to execute a discovery pattern based on the received user-input. The discovery pattern may include a sequence of operations for discovery of the storage cluster 108. At least one operation of the sequence of operations may include transmission of the plurality of API calls to the IP (or the mvip) address of the storage cluster 108. The plurality of API calls may include, but is are not limited to, a first API call, a second API call, a third API call, a fourth API call, a fifth API call, and a sixth API call. The discovery server 102A may receive a plurality of responses from the storage cluster 108 based on the transmitted plurality of API calls. The received plurality of responses may include, but is are not limited to, a first response, a second response, a third response, a fourth response, a fifth response, and a sixth response. Specifically, the first response may be received based on the transmitted first API call. The second response may be received based on the transmitted second API call. The third response may be received based on the transmitted third API call. The fourth response may be received based on the transmitted fourth API call. Similarly, the fifth response may be received based on the transmitted fifth API call and the sixth response may be received based on the transmitted sixth API call. The details about the transmitted plurality of API calls and the received plurality of responses are provided, for example, in FIG. 3.

The discovery server 102A may be further configured to parse the received plurality of responses to extract information associated with the set of resources 110 within the storage cluster 108. The extracted information may be related to the set of nodes 112, and the set of drives 114. The information related to the set of nodes 112 may include information about hardware related attributes, software related attributes, and networking related attributes of the set of nodes 112. The information about the set of drives 114 may include information about hardware related attributes about a disk that may be the physical manifestation of a drive of the set of drives 114.

The discovery server 102A may be further configured to generate one or more configuration items (CIs) associated with the storage cluster 108 in the CMDB 102D stored on the discovery server 102A based on the parsed information. The discovery server 102A may be further configured to generate a dependency map between the set of resources 110 associated with the storage cluster 108 based on the parsed information and the generated one or more Cis, and further output (or display) the generated dependency map on the application interface 116. The details about the one or more CIs and the generated dependency map are provided, for example, in FIG. 4.

In some embodiments, the received user-input may further include schedule information related to discovery schedule for the discovery of storage cluster 108. The schedule information may include a periodic interval (e.g., weekly, daily, every 12 hours, etc.) based on which the discovery server 102A may be configured to re-execute one or more operations of the sequence of the operations to discover the storage cluster 108. The discovery server 102A may be further configured to set the discovery schedule for the discovery of the storage cluster 108 based on the information indicating the discovery schedule in the user-input.

Figure 2:
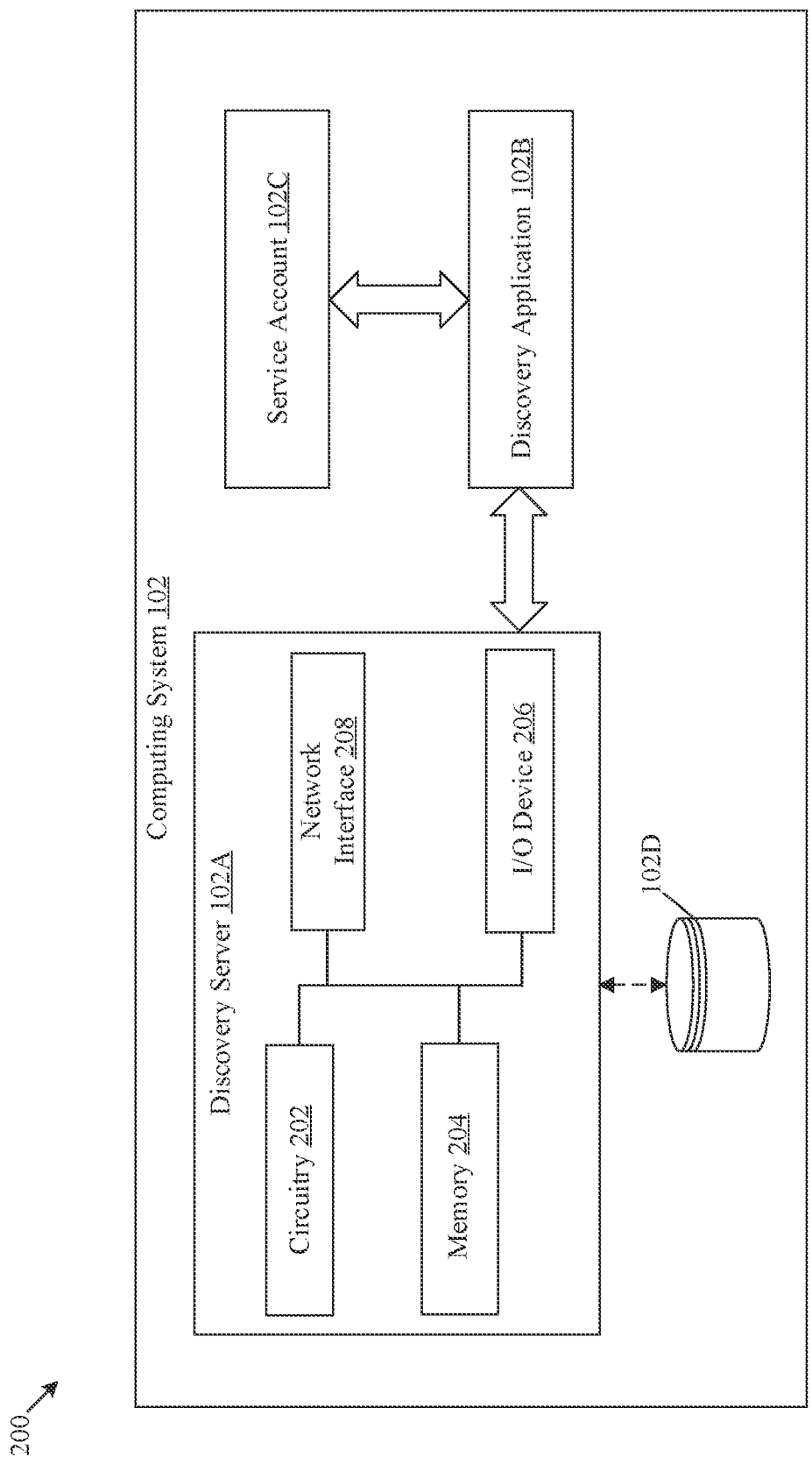
FIG. 2 is a block diagram of a computing system for automatic discovery of storage cluster, in accordance with an embodiment of the disclosure.

FIG. 2 is a block diagram of a computing system for automatic discovery of storage cluster, in accordance with an embodiment of the disclosure. FIG. 2 is explained in conjunction with elements from FIG. 1. With reference to FIG. 2, there is shown a block diagram 200 of the computing system 102. The computing system 102 may include the discovery server 102A, the discovery application 102B, the Service Account 102C, and the CMDB 102D. The discovery server 102A may be coupled to the discovery application 102B and the CMDB 102D. The discovery application 102B may be associated with the Service Account 102C. The discovery server 102A may include circuitry 202, a memory 204, an input/output (I/O) device 206, and a network interface 208. In some embodiments, the CMDB 102D may be separate from the discovery server 102A and may communicate with the discovery server 102A via the network interface 208. In some other embodiments, the memory 204 may include the CMDB 102D.

The circuitry 202 may be configured to communicate with the discovery application 102B and the CMDB 102D by use of the network interface 208. The circuitry 202 may include suitable logic, circuitry, interfaces, and/or code that may be configured to execute instructions for operations to be executed by the discovery server 102A to discover the storage cluster 108. Examples of implementation of the circuitry 202 may include a Central Processing Unit (CPU), x86-based processor, a Reduced Instruction Set Computing (RISC) processor, an Application-Specific Integrated Circuit (ASIC) processor, a Complex Instruction Set Computing (CISC) processor, a Graphical Processing Unit (GPU), co-processors, other processors, and/or a combination thereof.

The memory 204 may include suitable logic, circuitry, code, and/or interfaces that may be configured to store the instructions executable by the circuitry 202. The memory 204 may store the one or more configuration items associated with the storage cluster 108. In such case, the CMDB 102D may be implemented within the memory 204. In some embodiments, the memory may store the discovery pattern to discover the set of resources 110 of the storage cluster 108. Examples of implementation of the memory 204 may include, but are not limited to, Random Access Memory (RAM), Read Only Memory (ROM), Hard Disk Drive (HDD), and/or a Secure Digital (SD) card.

The I/O device 206 may include suitable logic, circuitry, and/or interfaces that may be configured to receive an input and provide an output based on the received input. For example, the I/O device 206 may receive the user-input that may include the authentication credentials associated with the storage cluster 108. In another example, the I/O device 206 may render the generated dependency map. The I/O device 206 may include various input and output devices, which may be configured to communicate with the circuitry 202. Examples of the I/O device 206 may include, but are not limited to, a touch screen, a keyboard, a mouse, a joystick, a display device (e.g., the display device), a microphone, or a speaker.

The network interface 208 may include suitable logic, circuitry, interfaces, and/or code that may be configured to enable communication between the discovery server 102A, the discovery application 102B, the service account 102C, and the CMDB 102D via one or more communication networks. The network interface 208 may implement known technologies to support wired or wireless communication with the one or more communication networks. The network interface 208 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 208 may communicate via wireless communication with networks, such as the Internet, an Intranet, and/or a wireless network, such as a cellular telephone network, a wireless local area network (LAN) and/or a metropolitan area network (MAN). The wireless communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

Similar to the discovery server 102A, the user device 104 (though not shown in FIG. 2) may include one or more components including, but not limited to, circuitry, a memory, a I/O device, a display device, and a network interface with similar functions. The functions or operations executed by the discovery server 102A, as described in FIGS. 1, 3, 4, and 5, may be performed by the circuitry 202. Operations executed by the circuitry 202 are described in detail, for example, in FIGS. 1, 3, 4, and 5.

Figure 3:
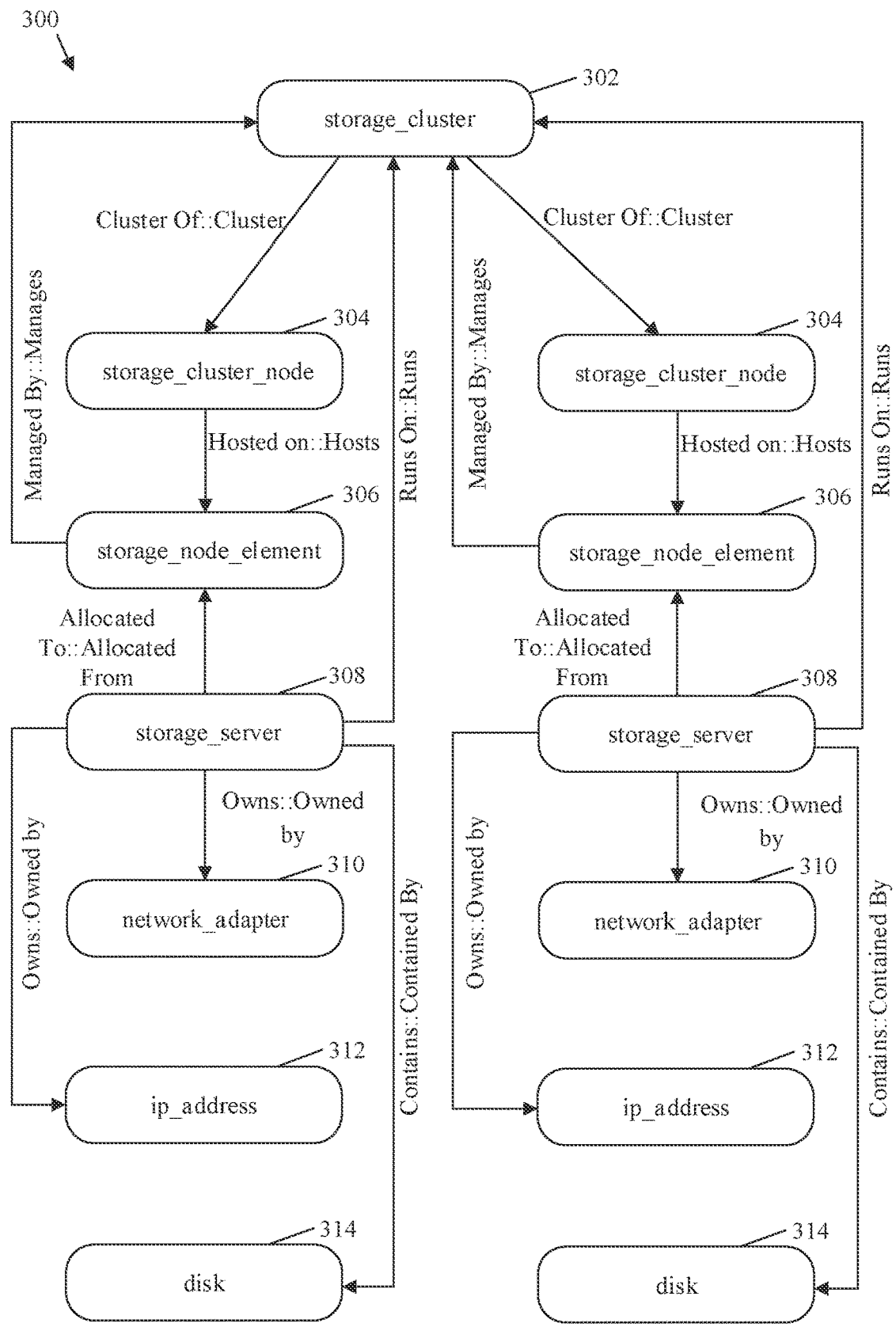
FIG. 3 is a diagram that illustrates an exemplary class model of a storage cluster, in accordance with an embodiment of the disclosure.

FIG. 3 is a diagram illustrates an exemplary class model of a storage cluster, in accordance with an embodiment of the disclosure. FIG. 3 is explained in conjunction with elements from FIG. 1 and FIG. 2. With reference to FIG. 3, there is shown a class model 300 for the storage cluster 108 (as described in FIG. 1). The class model 300 includes a plurality of classes and relationships among two or more classes of the plurality of classes. Each of the plurality of classes may correspond to a configuration item (CI). The class model 300 is merely shown as an example and should not be construed as limiting for the disclosure.

The class model 300 may be generated based on the received information included in the plurality of responses that may be received from the storage cluster 108 in response to the transmitted plurality of API calls. For discovery of the SolidFire® storage cluster, each of the plurality of API calls may correspond to a NetApp® Solid-Fire® Element Operating system (OS) API (also known as SolidFire® API) call. The SolidFire® API may be based on the JavaScript Object Notation (JSON)-remote procedure call (RPC) protocol over Hypertext Transfer Protocol Secure (HTTPS). JSON-RPC is a simple text based RPC protocol based on the lightweight JSON data-interchange format. Each of the plurality of API calls may be made via HTTPS POST requests to the storage cluster 108 (or an API endpoint). The body of the POST request may be a JSON-RPC request object. Each of the plurality of API calls may have one or more request object members. The request object members may include, but is not limited to, a name of the method to be invoked at the API endpoint and an object including one or more parameters of the method being invoked.

Each of the plurality of responses may include one or more response object members. The one or more response object members may include, but is not limited to, an object returned by the method, an object returned when an error occurs, an identifier used to match the request to response, as provided in the corresponding request, and a warning message that at least one incorrect parameter has been passed to the API method and has not been used. Each of the plurality of responses may include a plurality of key-value pairs for each attribute. In an embodiment, the HTTPS API endpoint for the storage cluster 108 may be "https://<mvip>/json-rpc/<api-version>" wherein the mvip may be the management virtual IP address for the storage cluster 108, and api-version may be the version of the API that is being used.

In an embodiment, the first API call of the plurality of API calls may be transmitted to the IP address of the storage cluster 108 to retrieve information about the cluster resource manager of the storage cluster 108. Specifically, the first API call may include instructions to invoke a "GetClusterVersionInfo" method on the API endpoint. The "GetClusterVersionInfo" method may retrieve information about an Element software version running on each of the set of nodes 112 in the storage cluster 108. It may be noted that the Element software may be the cluster resource manager for the storage cluster 108 (for example SolidFire® storage cluster). In another embodiment, the "GetClusterVersionInfo" method may also retrieve information about one or more nodes that may be currently in the process of the Element upgrading software. The first API call may have no input parameters.

By way of example and not limitation, the request object members included in the first API call may be presented as follows:
{
"method": "GetClusterVersionInfo",
"params": { },
"id": 1
}

Based on the transmitted first API call, the discovery server 102A may receive a first response from the storage cluster 108. The received first response may include first information about a software executing on each node of the set of nodes 112 associated with the storage cluster 108. In an embodiment, the circuitry 202 may be configured to parse the first response to determine the first information. In another embodiment, the first information may include, but is not limited to, information about the set of nodes 112 and a version of element software currently running on the each node of the set of nodes 112 (i.e. clusterVersionInfo attribute), information about a current API version on the storage cluster 108 (i.e. clusterAPIVersion attribute), information about a version of element software currently running on the storage cluster 108 (i.e. clusterVersion attribute), information about a version that the cluster software is currently being upgraded or reverted to (i.e. pendingClusterVersion attribute), and information about a state of an upgrade (i.e. SoftwareVersionInfo attribute).

By way of example and not limitation, an exemplary first response may be presented as follows:

{
  "id": 1,
  "result": {
    "clusterAPIVersion": "6.0",
    "clusterVersion": "6.1382",
    "clusterVersionInfo": [
    {
      "nodeID": 1,
      "nodeInternalRevision": "BuildType=Release Element=carbon Release=carbon ReleaseShort=carbon Version=6.1382 sfdev=6.28 Repository=dev Revision=061511b1e7fb BuildDate=2014-05-28T18:26:45MDT",
      "nodeVersion": "6.1382"
    },
    {
      "nodeID": 2,
      "nodeInternalRevision": "BuildType=Release Element=carbon Release=carbon ReleaseShort=carbon Version=6.1382 sfdev=6.28 Repository=dev Revision=061511b1e7fb BuildDate=2014-05-28T18:26:45MDT",
      "nodeVersion": "6.1382"
    },
    ],
    "softwareVersionInfo": {
      "currentVersion": "6.1382",
      "nodeID": 0,
      "packageName": "",
      "pendingVersion": "6.1382",
      "startTime":
    }
  }
}

Based on the reception of the first response, the discovery server 102A may be configured to transmit the second API call of the plurality of API calls to the IP address of the storage cluster 108 to further retrieve information about a configuration of the storage cluster 108. Specifically, the second API call may include instructions to invoke a "GetClusterInfo" method on the API endpoint. The "GetClusterInfo" method may retrieve information about the configuration of the storage cluster 108.

By way of example and not limitation, the request object members included in the second API call may be presented as follows:
{
"method": "GetClusterInfo",
"params": { },
"id": 1
}

Based on the transmitted second API call, the discovery server 102A may receive second response from the storage cluster 108. The received second response may include the second information about the configuration of the storage cluster 108. In an embodiment, the circuitry 202 may be configured to parse the second response to determine the second information. The second information may include, but is not limited to, information about the set of nodes 112 that may be a part of the storage cluster 108 (i.e. ensemble attribute), information about the mvip address of the storage cluster 108 (i.e. mvip attribute), information about an identifier of a node that holds the master mvip address (i.e. mvipNodeID attribute), and information about a name of the storage cluster 108 (i.e. name attribute).

By way of example and not limitation, the received second response is provided below:
```
{
  "id": 1,
  "result": {
  "clusterInfo": {
    "attributes": 0,
    "encryptionAtRestState": "disabled",
    "ensemble": [
      "10.10.21.23",
      "10.10.21.24",
      "10.10.21.25"
    ],
    "mvip": "10.10.1.57",
    "mvipInterface": "Bond1G",
    "mvipNodeID": 2,
    "mvipVlanTag": "120",
    "name": "Hulk",
    "repCount": 2,
    "svip": "10.10.21.57",
    "svipInterface": "Bond10G",
    "svipNodeID": 2,
    "svipVlanTag": "0",
    "uniqueID": "17nx",
    "uuid": "8d385a91-9acf-4371-8939-b29e085191fd"
    }
  }
}
```

Based on the reception of the second response, the discovery server 102A may be configured to transmit the third API call of the plurality of API calls to the IP address of the storage cluster 108 to further retrieve information about about one or more nodes of the set of nodes 112 associated with the storage cluster 108. Specifically, the third API call may include instructions to invoke a "ListActiveNodes" method on the API endpoint. The "ListActiveNodes" method may retrieve information about one or more active nodes in the storage cluster 108.

By way of example and not limitation, the request object members included in the third API call may be presented as follows:
```
{
  "method": "ListActiveNodes",
  "params": { },
  "id": 1
}
```

Based on the transmitted third API call, the discovery server 102A may receive third response from the storage cluster 108. The received third response may include third information about the one or more active nodes of the set of nodes 112 in the storage cluster 108. The third information may include, but is not limited to, information about a host name of each of the one or more active nodes (i.e. name attribute), information about a name of node model of each of the one or more active nodes (i.e. nodeType attribute), information about a management IP address associated with each of the one or more active nodes (i.e. mip attribute), information about a software version of the element OS software running on each of the one or more active nodes (i.e. softwareVersion attribute), information about a memory (in gigabytes) associated with each of the one or more active nodes (i.e. NodeMemoryGB attribute), information about a central processing unit (CPU) of each of the one or more active nodes (i.e. cpuModel attribute), information about chassis of each of the one or more active nodes (i.e. chassisType attribute).

By way of example and not limitation, the received third response is provided below:
```
{
  "id": 1,
  "result": {
    "nodes": [
      {
        "associatedFServiceID": 0,
        "associatedMasterServiceID": 1,
        "attributes": { }
        "cip": "172.27.21.23",
        "cipi": "Bond10G",
        "fibreChannelTargetPortGroup": null,
        "mip": "172.27.1.23",
        "mipi": "Bond1G",
        "name": "PSN-1-23",
        "nodeID": 1,
        "platformInfo": {
          "chassisType": "R620",
          "cpuModel": "Intel(R) Xeon(R) CPU E5-2640 0 @ 2.50GHz",
          "nodeMemoryGB": 72,
          "nodeType": "SF3010"
        },
        "sip": "172.27.21.23",
        "sipi": "Bond10G",
        "softwareVersion": "9.0.0.1298",
        "uuid": "4C4C4544-0056-3810-804E-B5C04F4C5631",
        "virtualNetworks": [
          {
            "address": "10.1.2.4",
            "virtualNetworkID": 1
          },
          {
            "address": "10.2.2.10",
            "virtualNetworkID": 2
          }
        ]
      },
      {
        "associatedFServiceID": 0,
        "associatedMasterServiceID": 3,
        "attributes": { }
        "cip": "172.27.21.26",
        "cipi": "Bond10G",
        "fibreChannelTargetPortGroup": null,
        "mip": "172.27.1.26",
        "mipi": "Bond1G",
        "name": "PSN-1-26",
        "nodeID": 4,
        "platformInfo": {
          "chassisType": "R620",
          "cpuModel": "Intel(R) Xeon(R) CPU E5-2640 0 @ 2.50GHz",
          "nodeMemoryGB": 72,
          "nodeType": "SF3010"
        },
        "sip": "172.27.21.26",
        "sipi": "Bond10G",
        "softwareVersion": "9.0.0.1298",
        "uuid": "4C4C4544-0056-3810-804E-B4C04F4C5631",
        "virtualNetworks": [
          {
            "address": "10.1.2.7",
            "virtualNetworkID": 1
          },
```

```
        {
          "address": "10.2.2.13",
          "virtualNetworkID": 2
        }
      ]
    }
  ]
}
```

Based on the reception of the third response, the discovery server 102A may be further configured to transmit the fourth API call of the plurality of API calls to the IP address of the storage cluster 108, to further retrieve information about the set of nodes 112 associated with the storage cluster 108. Specifically, the fourth API call may include instructions to invoke a "GetNodeHardwareInfo" method on the API endpoint. The "GetNodeHardwareInfo" method may retrieve hardware information about one or more nodes of the set of nodes 112 associated with the storage cluster 108.

By way of example and not limitation, the request object members included in the fourth API call may be presented as follows:

```
{
  "method": "GetNodeHardwareInfo",
  "params": {
    "nodeID": 1
  },
  "id": 1
}
```

Based on the transmitted fourth API call, the discovery server 102A may receive fourth response from the storage cluster 108. The received fourth response may include fourth information about the hardware information and status for the one or more nodes specified. In another embodiment, the fourth information may indicate the hardware information for the active nodes of the set of nodes 112 of the storage cluster 108. The fourth information may include information about firmware of the one or more nodes (i.e. actual attribute nested in BIOS_version attribute), information about a serial number of a chassis of the one or more nodes (i.e. chassisSerial attribute), information about a name of each drive within the one or more nodes (i.e. name attribute), information about a vendor of each drive within the one or more nodes (i.e. vendor attribute), and information about a model number of each drive within the one or more nodes (i.e. product attribute).

By way of example and not limitation, the received fourth response is provided below:

```
{
  "id": 1,
  "result": {
    "nodeHardwareInfo": {
      "bus": {
        "core_DMI:0200": {
          "description": "Motherboard",
          "physid": "0",
          "product": "0H47HH",
          "serial": "..CN7475141I0271.",
          "vendor": "SolidFire",
          "version": "A07"
        }
      },
      {
        "BIOS_VERSION ": {
          "Passed ": true,
          "actual ": "112",
          "comparator ": ">=",
          "expected ": "104"
        }
      },
      {
        "core_DMI:0200": {
          "description": "Motherboard",
          "physid": "0",
          "product": "0H47HH",
          "serial": "..CN7475141I0271.",
          "vendor": "SolidFire",
          "version": "A07"
        }
      },
      "driveHardware": [
        {
          "canonicalName": "sdb",
          "connected": true,
          "dev": 2064,
          "devPath": "/dev/slot0",
          "driveType": "Slice",
          "lifeRemainingPercent": 98,
          "lifetimeReadBytes": 0,
          "lifetimeWriteBytes": 14383412879360,
          "name": "scsi-SATA_SAMSUNG_MZ7GE24S1M9NWAG601096",
          "path": "/dev/sdb",
          "pathLink": "/dev/slot0",
          "powerOnHours": 14311,
          "product": "SAMSUNG MZ7GE240HMGR-00003",
          "reallocatedSectors": 0,
          "reserveCapacityPercent": 100,
          "scsiCompatId": "scsi-SATA_SAMSUNG_MZ7GE24S1M9NWAG601096",
          "scsiState": "Running",
          "securityAtMaximum": false,
          "securityEnabled": false,
          "securityFrozen": false,
          "securityLocked": false,
          "securitySupported": true,
          "serial": "S1M9NWAG601096",
          "size": 240057409536,
          "slot": 0,
          "uuid": "97daf7b1-06e2-0d64-8494-cd5c73d38ac4",
          "vendor": "Samsung",
          "version": "EXT1303Q"
        },
        {
          "canonicalName": "sdh",
          "connected": true,
          "dev": 2160,
          "devPath": "/dev/slot1",
          "driveType": "Block",
          "lifeRemainingPercent": 99,
          "lifetimeReadBytes": 0,
          "lifetimeWriteBytes": 727843479552,
          "name": "scsi-SATA_SAMSUNG_MZ7GE24S1M9NWAG601479",
          "path": "/dev/sdh",
          "pathLink": "/dev/slot1",
          "powerOnHours": 14311,
          "product": "SAMSUNG MZ7GE240HMGR-00003",
          "reallocatedSectors": 0,
          "reserveCapacityPercent": 100,
          "scsiCompatId": "scsi-SATA_SAMSUNG_MZ7GE24S1M9NWAG601479",
          "scsiState": "Running",
          "securityAtMaximum": false,
          "securityEnabled": false,
          "securityFrozen": false,
          "securityLocked": false,
          "securitySupported": true,
          "serial": "S1M9NWAG601479",
          "size": 240057409536,
          "slot": 1,
```

```
        "uuid": "dd3dc3cf-3649-a817-e273-0dfce5e40d3a",
        "vendor": "Samsung",
        "version": "EXT1303Q"
    },
    {
```

Based on the reception of the fourth response, the discovery server 102A may be further configured to transmit a fifth API call of the plurality of API calls to the IP address of the storage cluster 108, to further retrieve information about one or more network interfaces associated with the storage cluster 108. Specifically, the fifth API call may include instructions to invoke a "ListNetworkInterfaces" method on the API endpoint. The "ListNetworkInterfaces" method may retrieve information about one or more network interface on each individual node of the storage cluster 108 or about all network interfaces of the storage cluster 108. In an embodiment, if a parameter "force" with value "true" is passed in the fifth API call, then the "ListNetworkInterfaces" method may retrieve the information about one or more network interfaces of the storage cluster 108. In another embodiment, if a parameter "force" with value "false" is passed in the fifth API call, then the "ListNetworkInterfaces" method may retrieve the information about one or more network interfaces on each individual node of the storage cluster 108.

By way of example and not limitation, the request object members included in the fourth API call may be presented as follows:

```
{
"method": "ListNetworkInterfaces",
"params": {
    "force": "true"
  },
"id": 1
}
```

Based on the transmitted fifth API call, the discovery server 102A may receive fifth response from the storage cluster 108. The received fifth response may include fifth information about each of the one or more network interfaces associated with the storage cluster 108. The fifth information may include, but is not limited to, information about an IP address of each network interface in the storage cluster 108 (i.e. address attribute), information about a name of each network interface in the storage cluster 108 (i.e. name attribute), information about a hardware address (or MAC address) used to configure each network interface in the storage cluster 108 (i.e. macAddress attribute), and information about a netmask of each network interface in the storage cluster 108 (i.e. netmask attribute).

By way of example and not limitation, the received fourth response is provided below:

```
{
    "id": 1,
    "result": {
        "interfaces": [
            {
                "address": "172.27.63.23",
                "broadcast": "172.27.63.255",
                "macAddress": "d4:ae:52:8e:db:41",
                "mtu": 9000,
                "name": "Bond10G",
                "netmask": "255.255.255.0",
                "status": "UpAndRunning",
                "type": "BondMaster",
                "virtualNetworkTag": 0
            },
            {
                "address": "172.27.62.23",
                "broadcast": "172.27.62.255",
                "macAddress": "d4:ae:52:8e:db:45",
                "mtu": 1500,
                "name": "Bond1G",
                "netmask": "255.255.255.0",
                "status": "UpAndRunning",
                "type": "BondMaster",
                "virtualNetworkTag": 0
            },
            {
                "address": "0.0.0.0",
                "broadcast": "0.0.0.0",
                "macAddress": "d4:ae:52:8e:db:43",
                "mtu": 9000,
                "name": "eth1",
                "netmask": "255.255.255.255",
                "status": "UpAndRunning",
                "type": "BondSlave",
                "virtualNetworkTag": 0
            }
        ]
    }
}
```

Based on the reception of the fifth response, the discovery server 102A may be further configured to transmit the sixth API call of the plurality of API calls to the IP address of the storage cluster 108, to further retrieve information about the set of drives 114. Specifically, the sixth API call may include instructions to invoke a "ListDrives" method on the API endpoint. The "ListDrives" method may retrieve information about one or more drives (i.e. out of the set of drives 114) associated with the one or more active nodes of the storage cluster 108.

By way of example and not limitation, the request object members included in the fourth API call may be presented as follows:

```
{
"method": "ListDrives",
"params": { },
"id": 1
}
```

Based on the transmitted sixth API call, the discovery server 102A may receive sixth response from the storage cluster 108. This sixth response may include sixth information about the one or more drives associated with each of one or more nodes of the set of nodes 112. The sixth information may include, but is not limited to, information about a capacity of each of the one or more drives (i.e. capacity attribute), information about a drive identifier of each of the one or more drives (i.e. driveID attribute), information about a serial number associated with of each of the one or more drives (i.e. serial attribute), and information about a type of each of the one or more drives (i.e. type attribute). Each drive may be of a volume metadata type (i.e. stores volume metadata), block type (i.e. stores block data) or unknown (i.e. if drive is not yet active or is yet to be determined).

By way of example and not limitation, the received sixth response is provided below:

```
{
    "id": 1,
    "result": {
        "drives": [
            {
                "attributes":
                    "capacity": 299917139968,
                    "driveID": 35,
                    "nodeID": 5,
                    "serial": "scsi-
SATA_INTEL_SSDSA2CW6CVPR141502R3600FGN-
                        part2",
                    "slot": 0,
                    "status": "active",
                    "type": "volume"
            },
            {
                "attributes": 0,
                "capacity": 600127266816,
                "driveID": 36,
                "nodeID": 5,
                "serial": "scsi-
SATA_INTEL_SSDSA2CW6CVPR1415037R600FGN",
                "slot": 6,
                "status": "active",
                "type": "block"
            }
        ]
    }
}
```

In an embodiment, the discovery server 102A may parse the received fourth response to extract information about the hardware included in one or more nodes of the set of nodes 112 associated with the storage cluster 108. In some instances, the received fourth response may not include information about the drives associated with the one or more nodes. The discovery server 102A may be further configured to transmit a seventh API call of the plurality of API calls to the IP address of the storage cluster 108, to further retrieve information about the set of drives 114 associated the one or more nodes. Specifically, the seventh API call may include instructions to invoke a "GetDriveHardwareInfo" method on the API endpoint. The "GetDriveHardwareInfo" method may retrieve hardware information about one or more drives (i.e. out of the set of drives 114).

By way of example and not limitation, the request object members included in the fourth API call may be presented as follows:
{
"method": "GetDriveHardwareInfo",
"params": {
  "driveID": 5
},
"id": 100
}

Based on the transmitted seventh API call, the discovery server 102A may receive a seventh response from the storage cluster 108. This seventh response may include seventh information about the one or more drives. The seventh information may include, for example, information about a name of each drive within the one or more nodes (i.e. name attribute), information about a vendor of each drive within the one or more nodes (i.e. vendor attribute), information about a model number of each drive within the one or more nodes (i.e. product attribute), and the like. An example of the received seventh response is provided, as follows:

{
"id": 100,
"result": {
  "driveHardwareInfo": {
    "description": "ATA Drive",
    "dev": "8:80",
    "devpath":    "/devices/pci0000:40/0000:40:01.0/
       0000:41:00.0/host6/port-6:0/expander-6:0/port-6:
       0:4/end_device-6:0:4/target6:0:4/6:0:4:0/block/
       sdf",
    "driveSecurityAtMaximum": false,
    "driveSecurityFrozen": false
    "driveSecurityLocked": false,
    "logicalname": "/dev/sdf",
    "product": "INTEL SSDSA2CW300G3",
    "securityFeatureEnabled": false,
    "securityFeatureSupported": true,
    "serial": "CVPR121400NT300EGN",
    "size": "300069052416",
    "uuid": "7e1fd5b9-5acc-8991-e2ac-c48f813a3884",
    "vendor": "Intel",
    "name": "INTEL SSDSA2CW300G3",
    "version": "4PC10362"
  }
}
}

It should be noted that the plurality of API calls may include additional API calls, other than the first API call, the second API call, the third API call, the fourth API call, the fifth API call, the sixth API call, and the seventh API call. Such additional calls may be used to retrieve more (or detailed) information about the storage cluster 108. The details about such additional API calls are omitted from the present disclosure for the sake of brevity. It should be further noted that the values of one or more attributes may be retrieved from the responses associated with more than one API call. For example, the values of the name attribute, the vendor attribute, and the product attribute may be retrieved from the fourth response as well as the seventh response.

The discovery server 102A may be further configured to generate one or more configuration items (CIs) associated with the storage cluster 108. Specifically, the discovery server 102A may generate the one or more CI's associated with the storage cluster 108, the set of the nodes 112, and the set of drives 114. The generated one or more CI's may be stored in the CMDB 102D. It may be noted that the generation of the one or more CI's may be done only once during the first execution of the discovery pattern. After the first execution of the discovery pattern, the generated one or more CI's, already stored in the CMDB 102D, may be updated based on the information received in response to the execution of the discovery patterns in the future.

The discovery server 102A may be further configured to generate the class model (such as the class model 300) further based on the generated (or updated) one or more CIs. In an embodiment, the discovery server 102A may be configured to generate a dependency map (such as a dependency map 400, for example, shown in FIG. 4) between the set of resources 110 (i.e. set of nodes 112 and the set of drives 114) based on the generated (or updated) one or more Cis. As discussed above, the generated class model may include the plurality of classes. Specifically, the plurality of classes may include, but is not limited to, a first class associated with the storage cluster 108, a second class associated with the set of nodes 112 of the storage cluster 108, a third class associated with a set of storage node elements associated with the set of nodes 112, a fourth class associated with a set of storage servers on which the set of nodes 112 may be hosted, a fifth class associated with network adapters, a sixth class associated with network addresses, and a seventh class associated with the set of drives 114 (or disks).

As shown in FIG. 3, the first class may be a "storage_cluster" class (denoted by 302), the second class may be a "storage_cluster_node" class (denoted by 304), the third class may be a "storage_node_element" class (denoted by 306), the fourth class may be a "storage_server" class (denoted by 308), the fifth class may be a "network_adapter" class (denoted by 310), the sixth class may be a "ip_address" class (denoted by 312), and the seventh class may be a "disk" class (denoted by 314).

The first class 302 may be associated with the storage cluster 108. The first class 302 may further include one or more fields that may store information associated with the storage cluster 108. In an embodiment, values of the one or more fields of the first class 302 may be determined from the information parsed from the plurality of responses. In another embodiment, the values of the one or more fields may be hardcoded. By way of example and not limitation, exemplary one or more fields of the first class 302 along with their description, and the source of their values may be presented in Table 1:

TABLE 1

Exemplary fields of the "storage_cluster" class.

| First Class Fields | Field description | Value Source |
|---|---|---|
| ip address | An IP address of the storage cluster 108. | Value of "mvip" attribute in the second response of the second API call. |
| manufacturer | A name of the manufacturer of the storage cluster 108. | Hardcoded Value: SolidFire |
| short_description | A short description about the storage cluster 108. | Combination of Hardcoded value and value of "mvipNodeID" attribute of the second response of second API call. |
| cluster_version | A version of the Element Software running on the storage cluster 108. | Value of "clusterVersion" attribute in the first response of the first API call. |
| name | A name of the storage cluster 108. | Value of "name" attribute in the second response of the second API call. |

The second class 304 may be associated with generic information of the set of nodes 112. The second class 304 may further include one or more fields that may store information associated with the set of nodes 112. In an embodiment, values of the one or more fields of the second class 304 may be determined from the information parsed from the plurality of responses. In another embodiment, the values of the one or more fields may be hardcoded. In another embodiment, the values may be a reference to any other class of the plurality of classes. By way of example and not limitation, exemplary one or more fields of the second class 304 along with their description, and the source of their values may be presented in Table 2:

TABLE 2

Exemplary fields of the "storage_cluster_node" class.

| Second Class Fields | Field description | Value Source |
|---|---|---|
| name | A name of a storage cluster node. | Value of "name" attribute in the third response of the third API call. |
| operational_status | An operational status of the cluster node. | Hardcoded Value: Installed |
| cluster | A reference to the first class. | A reference to the first class. |

The third class 306 may be associated with hardware of at least one of the set of nodes 112. The third class 306 may further include one or more fields that may store information associated with the hardware of at least one of the set of nodes 112. In an embodiment, values of the one or more fields of the third class 306 may be determined from the information parsed from the plurality of responses. In another embodiment, the values of the one or more fields may be hardcoded. By way of example and not limitation, exemplary one or more fields of the third class 306 along with their description, and the source of their values may be presented in Table 3:

TABLE 3

Exemplary fields of the "storage_node_element" class.

| Third Class Fields | Field description | Value Source |
|---|---|---|
| short_description | A short description about the node. | Combination of Hardcoded value and value of "mvipNodeID" attribute of the second response of the second API call. |
| manufacturer | A name of the manufacturer of the node. | Hardcoded Value: SolidFire |
| serial_number | A serial number of the chassis of the node. | Value of "Serial" attribute in the fourth response of the fourth API call. |
| model_id | A name of the model of the node. | Value of "nodeType" attribute in the third response of the third API call. |
| ram | The amount of memory installed in the node (in GB). third API | Value of "NodeMemoryGB" attribute in the third response of the call. |
| cpu_type | The CPU model of the node. | Value of "cpuModel" attribute in the third response of the third API call. |
| cpu manufacturer | The CPU model of the node. | Value of "cpuModel" attribute in the third response of the third API call. |
| chassis_type | The type of chassis that contains the node. | Value of "chassisType" attribute in the third response of the third API call. |

The fourth class 308 may be associated with the storage server on which the set of nodes 112 may be hosted. The fourth class 308 may further include one or more fields. In an embodiment, values of the one or more fields of the fourth class 308 may be determined from the information parsed from the plurality of responses. In another embodiment, the values of the one or more fields may be hardcoded. By way of example and not limitation, exemplary one or more fields of the fourth class 308 along with their description and the source of their values, may be presented in Table 4:

TABLE 4

Exemplary fields of the "storage_server" class.

| Fourth Class Fields | Field description | Value Source |
|---|---|---|
| name | A name of the node. | Value of "name" attribute in the third response of the third API call. |
| firmware_version | A BIOS version of the node. | Value is retrieved from the fourth response of the fourth API call. |
| serial_number | A serial number of the chassis of the node. | Value of "Serial" attribute in the fourth response of the fourth API call. |
| manufacturer | A name of the manufacturer of the node. | Hardcoded Value: SolidFire |
| model_id | A name of the model of the node. | Value of "nodeType" attribute in the third response of the third API call. |
| short_description | A short description about the node. | Hardcoded Value: SolidFire Storage Cluster |
| ip_address | The management IP address assigned to the node. | Value of "mip" attribute in the third response of the third API call. |
| os | The operating system of the node. | Hardcoded Value: Element OS |
| os_version | The current version of the operating system running on the node. | Value of "softwareVersion" attribute in the third response of the third API call. |

The fifth class 310 may be associated with the network adapters of the set of nodes 112. The fifth class 310 may further include one or more fields. In an embodiment, values of the one or more fields of the fifth class 310 may be determined from the information parsed from the plurality of responses. By way of example and not limitation, exemplary one or more fields of the fifth class 310 along with their description and the source of their values, may be presented in Table 5:

TABLE 5

Exemplary fields of the "network_adapter" class.

| Fifth Class Fields | Field description | Value Source |
|---|---|---|
| name | A name of the network interface. | Value of "name" attribute in the fifth response of the fifth API call. |
| ip | An IP address of the network interface. | Value of "address" attribute in the fifth response of the fifth API call. |
| netmask | A netmask of the network interface. | Value of "netmask" attribute in the fifth response of the fifth API call. |
| mac_address | A hardware address used to configure the network interface. | Value of "macAddress" attribute in the fifth response of "the fifth API call. |

The sixth class 312 may be associated with the network addresses (i.e. internet protocol (IP) addresses) of the set of nodes 112. The sixth class 312 may further include one or more fields. In an embodiment, values of the one or more fields of the sixth class 312 may be determined from the information parsed from the plurality of responses. In another embodiment, the values of the one or more fields may be hardcoded. By way of example and not limitation, exemplary one or more fields of the sixth class 312 along with their description and the source of their values, may be presented in Table 6:

TABLE 6

Exemplary fields of the "ip_address" class.

| Sixth Class Fields | Field description | Value Source |
|---|---|---|
| ip | An IP address of the network interface. | Value of "address" attribute in the fifth response of the fifth API call. |
| netmask | A netmask of the network interface. | Value of "netmask" attribute in the fifth response of "the fifth API call. |

The seventh class 314 may be associated with the set of drives 114. seventh class 314 may further include one or more fields. In an embodiment, values of the one or more fields of the seventh class 314 may be determined from the received plurality of responses. In another embodiment, the values of the one or more fields may be hardcoded. In another embodiment, the value may be a reference to any other class of the plurality of classes. By way of example and not limitation, exemplary one or more fields of the seventh class 314 along with their description and the source of their values, may be presented in Table 7:

TABLE 7

Exemplary fields of the "disk" class.

| Seventh Class Fields | Field description | Value Source |
|---|---|---|
| name | The name of the node associated with the drive. | Value of "name" attribute in the seventh response of the seventh API call or Value of "name" attribute in the fourth response of the fourth API call. |
| device_id | An identifier of the drive. | Value of "driveID" attribute in the sixth response of the sixth API call. |
| serial_number | A serial number of the drive. | Value of "serial" attribute in the sixth response of the sixth API call. |
| manufacturer | A name of the vendor of the motherboard. | Value of "vendor" attribute in the seventh response of the seventh API call or Value of "vendor" attribute in the fourth response of the fourth API call. |
| model_id | A name of the model of the node. | Value of "product" attribute in the seventh response of the seventh API call or Value of "product" attribute in the fourth response of the fourth API call. |
| storage_type | A type of drive. | Value of "type" attribute in the sixth response of the sixth API call. |
| size_bytes | A total capacity of the drive in bytes. | Value of "capacity" attribute in the sixth response of the sixth API call. |
| computer | A reference to the third class. | A reference to the third class. |

In an embodiment, among the generated plurality of classes, the discovery server 102A may be configured to set the fourth class 308 associated with the set of storage servers as a main class (or a main CI) and every other class of the plurality of classes as a related class (or related CI). In an embodiment, the fourth class 308 may be set as the main CI based on a first user input. The main CI may represent the storage cluster 108 as a whole. In another embodiment, a second user input may be received to set a deletion strategy for each of the related classes (or the related CIs). The deletion strategy may include instructions to remove the related CI's from the CMDB 102D. The deletion strategy may be executed only after the first execution of the discovery pattern and/or when the discovery pattern may discover the main CI but may not be able to discover the related CI's (for example when one of resources (i.e. storage server, network adapter or disks) of the storage cluster 108 is down or non-operational).

The discovery server 102A may be further configured to determine a relationship between each of two or more classes that may correspond to the one or more configuration items (CIs). In another embodiment, the discovery server 102A may be configured to determine the relationship between each of the plurality of classes based on the relieved plurality of responses. The type of relationship may correspond to, but is not limited to, "exposes", "hosted on", "contain", "virtualizes", "member of", "uses", "extends", "Defines resources for", "Cluster of", and "registered on". By way of example and not limitation, if a Server1 is being managed by Server2, then the parent CI is Server2, the type of relationship is "Managed by". In an embodiment, a class model (such as the class model 300) between the one or more CI's may be generated based on the determined relationship. The details about the class model are provided, for example, in FIG. 3.

An example of the relationships between the plurality of classes is presented in Table 8, as follows:

TABLE 8

Example of relationships between plurality of classes.

| Class | Relationship | Class |
|---|---|---|
| storage_cluster | Cluster Of::Cluster | storage_cluster_node |
| storage_cluster_node | Hosted on::Hosts | storage_node_element |
| storage_node_element | Managed By::Manages | storage_cluster |
| storage_server | Allocated To::Allocated From | storage_node_element |
| storage_server | Runs On::Runs | storage_cluster |
| storage_server | Contains::Contained By | disk |
| storage_server | Owns::Owned by | network_adapter |
| storage_server | Owns::Owned by | ip_address |

The disclosed computing system 102 may be fast and efficient, as the disclosed computing system 102 may not require (or dependent on) any management software(s), embedded provider(s), or agent(s). Due to the same reason, a turnaround time of the discovery of the storage cluster 108 may be less. The plurality of responses from the storage cluster 108 for the discovery may be received via HTTP calls that may be fast and also return huge responses that may contain vast amount of data (as attributes) that can be parsed to determine information about the storage cluster 108, the set of nodes 112, and the set of drives 114. Based on the discovery of the storage cluster 108, the set of nodes 112, and the set of drives 114, the disclosed computing system 102 may present the determined or discovered information in an efficient, unique and meaningful manner as shown in the class model of FIG. 3 (and shown in a dependency map in FIG. 4) so that monitoring and the management of the storage cluster 108 may be easy and efficient.

Figure 4:
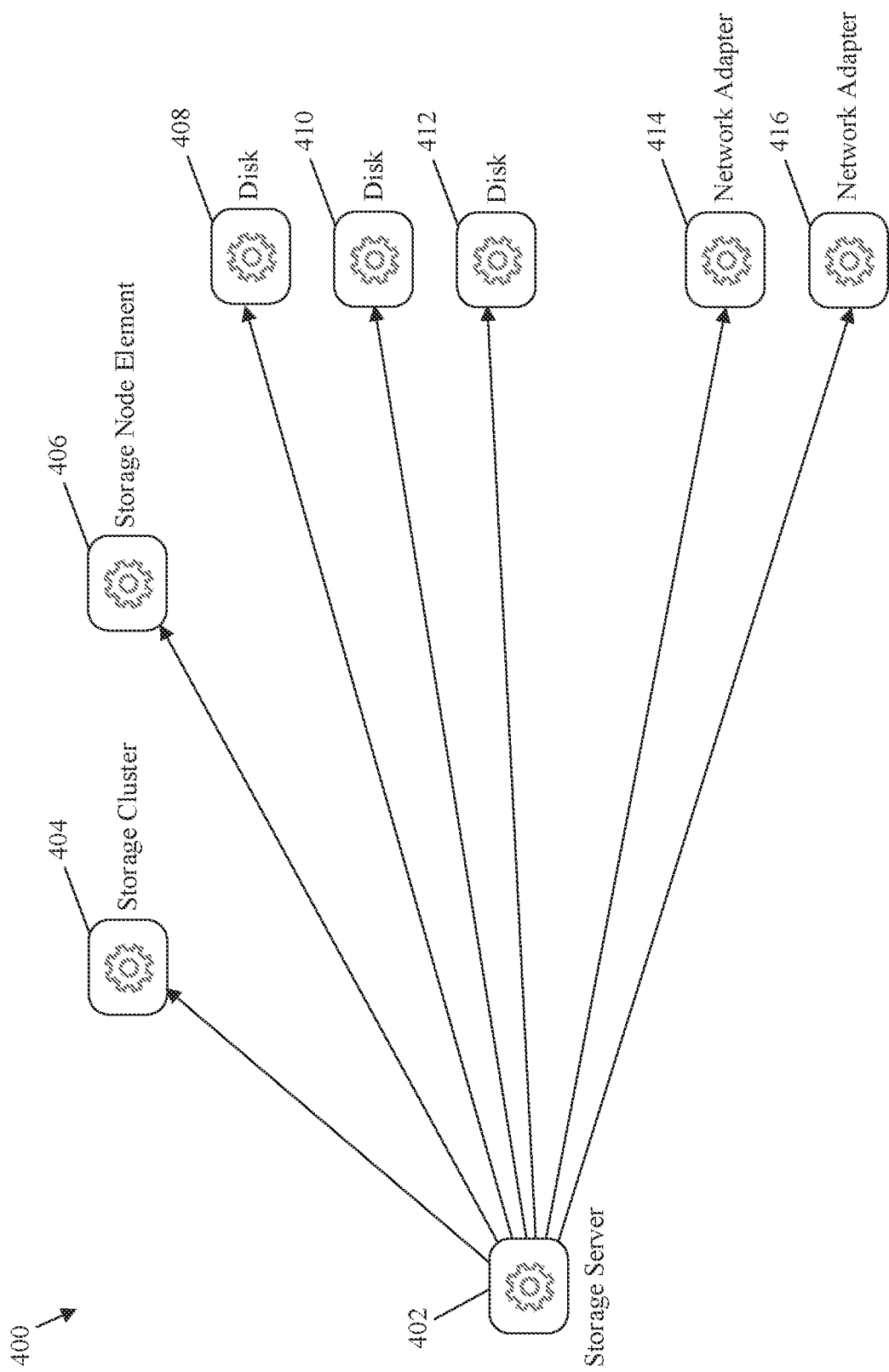
FIG. 4 is a diagram that illustrates an exemplary dependency map of a storage cluster, in accordance with an embodiment of the disclosure.

FIG. 4 is a diagram that illustrates an exemplary dependency map of a storage cluster, in accordance with an embodiment of the disclosure. With reference to FIG. 4, there is shown a dependency map 400 which may include a set of map icons. The set of map icons may include, but not limited to, a first map icon 402, a second map icon 404, a third map icon 406, a fourth map icon 408, a fifth map icon 410, a sixth map icon 412, a seventh map icon 414, and an eighth map icon 416.

The first map icon 402 may represent the storage server on which the set of nodes 112 may be hosted (or the storage server class). The first map icon 402 may represent the main CI. The second map icon 404 may represent the storage cluster 108 (or the storage_cluster class). The third map icon 406 may represent a storage node element (or the storage_node_element class). The fourth map icon 408, the fifth map icon 410 and the sixth map icon 412 may represent the set of drives 114 (or the disk class). The seventh map icon 414 and the eighth map icon 416 may represent the network adapters (or the network_adapter class). It may be noted that the number of map icons for the set of drives 114 and the network adapters shown in FIG. 4 is merely presented as an example. The dependency map may include one or more map icons for the set of drives 114 and the network adapters.

Each of the set of map icons may be associated with one or more map icons of the set of map icons. The association between the map icons may be based on the relation between the corresponding classes as described in Table 8. By way of example and not limitation, the first map icon 402 may be a root node of the dependency map 400. The first map icon 402 may be associated with the second map icon 404, the third map icon 406, the fourth map icon 408, the fifth map icon 410, the sixth map icon 412, the seventh map icon 414, and the eighth map icon 416.

In an embodiment, the discovery server 102A may be further configured to display the generated dependency map 400 on the application interface 116 of the user device 104 (shown in FIG. 1) associated with the user 118 or on the I/O device 206 (shown in FIG. 2). The discovery server 102A may control the display the generated dependency map 400 to provided better visibility to the user 118 and to monitor or to modify the storage cluster 108 for the user 118. In an embodiment, the discovery server 102A may be configured to transmit the generated class model (such as the class model 300) associated with the storage cluster 108 to the user device 104, such that the user device 104 may display the received class model on the application interface 116 for the user 118.

Figure 5:
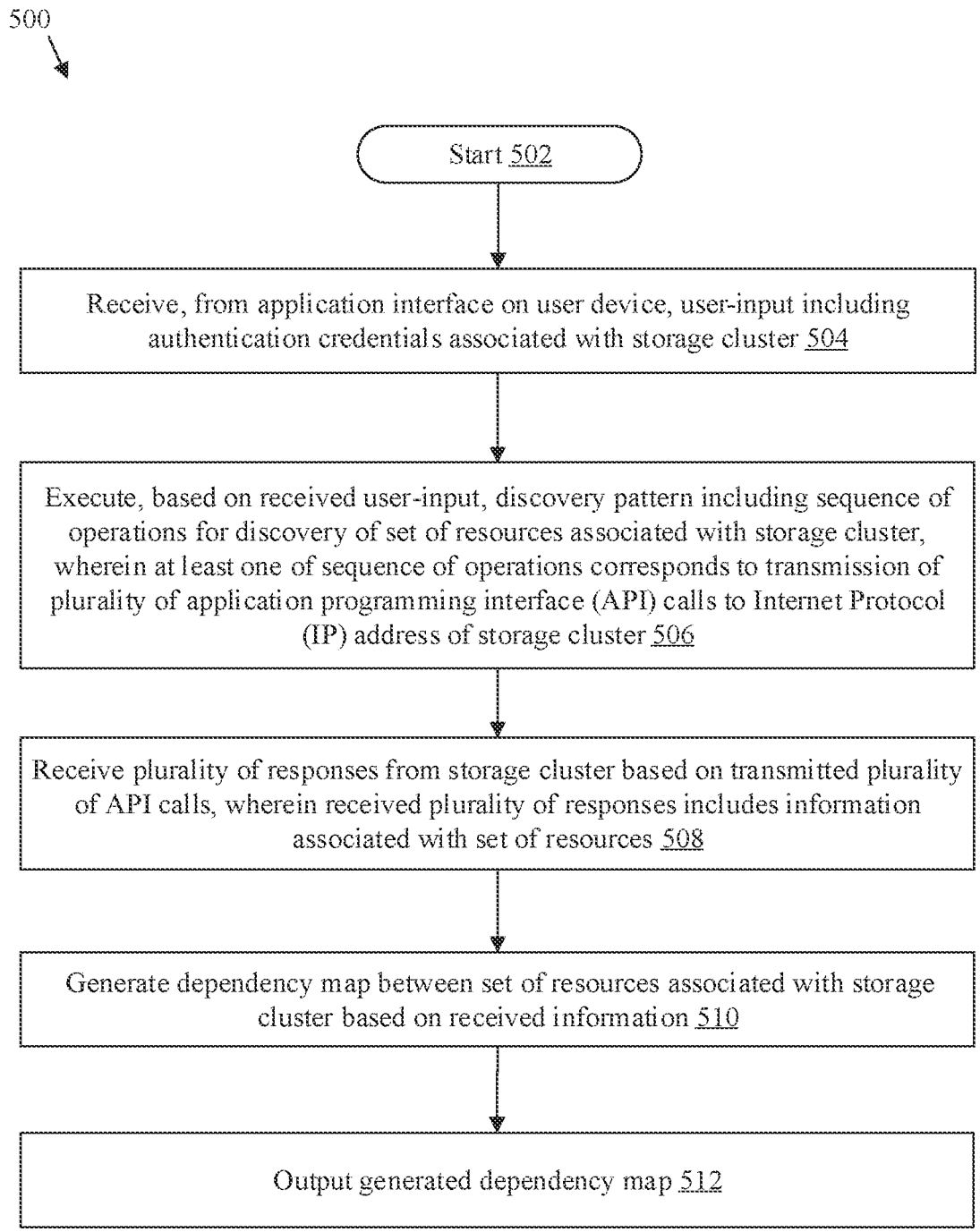
FIG. 5 is a flowchart that illustrates an exemplary method for automatic discovery of storage cluster, in accordance with an embodiment of the disclosure.

FIG. 5 is a flowchart that illustrates an exemplary method for automatic discovery of storage cluster, in accordance with an embodiment of the disclosure. FIG. 5 is described in conjunction with elements from FIGS. 1, 2, 3, and 4. With reference to FIG. 5, there is shown a flowchart 500. The exemplary method of the flowchart 500 may be executed by any computing system, for example, by the discovery server 102A of FIG. 1 or circuitry 202 of FIG. 2. The exemplary method of the flowchart 500 may start at 502 and proceed to 504.

At 504, a user-input may be received. The user-input may include authentication credentials associated with the storage cluster 108 and may be received from the application interface 116 on the user device 104. In one or more embodiments, the discovery server 102A or the circuitry 202 may be configured to receive the user-input from the application interface 116 on the user device 104. The user-input may include the authentication credentials associated with the storage cluster 108 as described, for example, in FIG. 1.

At 506, a discovery pattern may be executed. The execution of the discovery pattern may include a sequence of operations for a discovery of the set of resources 110 associated with the storage cluster 108. One of the sequence of operations may correspond to transmission of plurality of application programming interface (API) calls to Internet Protocol (IP) address of storage cluster 108. In one or more embodiments, the discovery server 102A or the circuitry 202 may be configured to execute the discovery pattern including the sequence of operations for the discovery of the set of resources 110 associated with the storage cluster 108 wherein one of the sequence of operations may correspond to transmission of the plurality of application programming interface (API) calls as described, for example, in FIG. 3.

At 508, a plurality of responses may be received from the storage cluster 108. The plurality of responses may include information associated with the set of resources 110. In one or more embodiments, the discovery server 102A or the circuitry 202 may be configured to receive the plurality of responses from the storage cluster 108 wherein the plurality of responses may include the information associated with the set of resources 110 as described, for example, in FIG. 3.

At 510, a dependency map between the set of resources 110 associated with storage cluster 108 may be generated based on the received information. In one or more embodiments, the discovery server 102A or the circuitry 202 may be configured to generate the dependency map (such as the dependency map 400) between the set of resources 110 associated with the storage cluster 108 based on the received or discovered information from the storage cluster 108 as described, for example, in FIGS. 3 and 4.

At 512, the generated dependency map may be outputted. In one or more embodiments, the discovery server 102A or the circuitry 202 may be configured to output the generated dependency map or control the display of the dependency map (such as the dependency map 400) via the I/O device 206 or via the application interface 116 as described, for example, in FIG. 4. Control may pass to end.

Although the flowchart 500 is illustrated as discrete operations, such as 504, 506, 508, 510, and 512, the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer-readable medium and/or storage medium having stored thereon, computer-executable instructions executable by a machine and/or a computer to operate a computing system (e.g., the computing system 102) for automatic discovery of a storage cluster. The computer-executable instructions may cause the machine and/or computer to perform operations that include receiving, from an application interface (e.g., the application interface 116) on a user device (e.g., the user device 104), a user-input including authentication credentials associated with a storage cluster (e.g., the storage cluster 108). The operations further include executing, based on the received user-input, a discovery pattern comprising a sequence of operations for a discovery of a set of resources (e.g., the set of resources 110) associated with the storage cluster. One of the sequence of operations may correspond to transmission of a plurality of first Application Programming Interface (API) calls to an Internet Protocol (IP) address of the storage cluster 108. The operations further include receiving a plurality of responses from the storage cluster 108, the plurality of responses may include information associated with the set of resources. The operations may further include generating a dependency map between the set of resources associated with the storage cluster based on the received information and further outputting the generated dependency map.

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively, or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long-term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures. While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A computing system, comprising:
a discovery server configured to:
receive, from an application interface on a user device, a user-input including authentication credentials associated with a storage cluster;
execute, based on the received user-input, a discovery pattern which comprises a sequence of operations for a discovery of a set of resources associated with the storage cluster, wherein
at least one of the sequence of operations corresponds to transmission of a plurality of application programming interface (API) calls to an Internet Protocol (IP) address of the storage cluster;
receive a plurality of responses from the storage cluster based on the transmitted plurality of API calls, the received plurality of responses comprises information associated with the set of resources;
generate a dependency map between the set of resources associated with the storage cluster based on the received information; and
output the generated dependency map.

2. The computing system according to claim 1, wherein the set of resources associated with the storage cluster comprises at least of: a set of nodes that comprise a set of drives.

3. The computing system according to claim 1, wherein the discovery server is further configured to parse the received plurality of responses to determine the information associated with the set of resources.

4. The computing system according to claim 1, wherein the authentication credentials are associated with a set of permissions, and wherein the set of permissions are required for authentication of each of the transmitted plurality of API calls to the IP address of the storage cluster.

5. The computing system according to claim 1, wherein the discovery server is further configured to:
generate one or more configuration items (CIs) associated with the storage cluster, to be further stored in a configuration management database (CMDB) stored on the discovery server; and
generate the dependency map between the set of resources associated with the storage cluster further based on the generated one or more CIs.

6. The computing system according to claim 1, wherein the discovery server is further configured to:
determine a relationship between one or more CI's associated with the storage cluster; and
generate a class model between the one or more CI's based on the determined relationship.

7. The computing system according to claim 6, wherein the class model comprises at least one of:
a first class associated with the storage cluster;
a second class associated with a set of nodes of the storage cluster;
a third class associated a set of storage node elements associated with the set of nodes;
a fourth class associated with a set of storage servers;
a fifth class associated with a set of network adapters;
a sixth class associated with a set of network addresses; or
a seventh class associated with a set of disks.

8. The computing system according to claim 6, wherein the discovery server is further configured to transmit the generated class model associated with the storage cluster to the user device to be further displayed on the application interface.

9. The computing system according to claim 1, wherein the user-input further includes schedule information indicating a discovery schedule, and wherein the discovery server is further configured to set the discovery schedule for the discovery of the storage cluster based on the schedule information in the user-input.

10. The computing system according to claim 1, wherein one of the sequence of operations corresponds to transmission of a first API call of the plurality of API calls to the IP address of the storage cluster,
wherein the discovery server is further configured to receive a first response from the storage cluster based on the transmitted first API call, and
wherein the received first response comprises first information about a software executing on each of a set of nodes associated with the storage cluster.

11. The computing system according to claim 1, wherein one of the sequence of operations corresponds to transmission of a second API call of the plurality of API calls to the IP address of the storage cluster,
   wherein the discovery server is further configured to receive a second response from the storage cluster based on the transmitted second API call, and
   wherein the received second response comprises second information about a configuration of the storage cluster.

12. The computing system according to claim 1, wherein one of the sequence of operations corresponds to transmission of a third API call of the plurality of API calls to the IP address of the storage cluster,
   wherein the discovery server is further configured to receive a third response from the storage cluster based on the transmitted third API call, and
   wherein the received third response comprises third information about one or more nodes of a set of nodes associated with the storage cluster.

13. The computing system according to claim 1, wherein one of the sequence of operations corresponds to transmission of a fourth API call of the plurality of API calls to the IP address of the storage cluster,
   wherein the discovery server is further configured to receive a fourth response from the storage cluster based on the transmitted fourth API call, and
   wherein the received fourth response comprises fourth information about hardware of a set of nodes associated with the storage cluster.

14. The computing system according to claim 1, wherein one of the sequence of operations corresponds to transmission of a fifth API call of the plurality of API calls to the IP address of the storage cluster,
   wherein the discovery server is further configured to receive a fifth response from the storage cluster based on the transmitted fifth API call, and
   wherein the received fifth response comprises fifth information about one or more network interfaces associated with the storage cluster.

15. The computing system according to claim 1, wherein one of the sequence of operations corresponds to transmission of a sixth API call of the plurality of API calls to the IP address of the storage cluster,
   wherein the discovery server is further configured to receive a sixth response from the storage cluster based on the transmitted sixth API call, and
   wherein the received sixth response comprises sixth information about one or more drives associated with each of one or more nodes of a set of nodes.

16. A method, comprising:
in a computing system:
receiving, from an application interface on a user device, a user-input including authentication credentials associated with a storage cluster;
executing, based on the received user-input, a discovery pattern which comprises a sequence of operations for a discovery of a set of resources associated with the storage cluster, wherein
   at least one of the sequence of operations corresponds to transmission of a plurality of application programming interface (API) calls to an Internet Protocol (IP) address of the storage cluster;
receiving a plurality of responses from the storage cluster based on the transmitted plurality of API calls, the received plurality of responses comprises information associated with the set of resources;
generating a dependency map between the set of resources associated with the storage cluster based on the received information; and
outputting the generated dependency map.

17. The method according to claim 16, wherein the set of resources associated with the storage cluster comprises at least of: a set of nodes that comprise a set of drives.

18. A non-transitory computer-readable medium having stored thereon, computer-executable instructions which, when executed by a computing system, causes the computing system to execute operations, the operations comprising:
receiving, from an application interface on a user device, a user-input including authentication credentials associated with a storage cluster;
executing, based on the received user-input, a discovery pattern which comprises a sequence of operations for a discovery of a set of resources associated with the storage cluster, wherein
   at least one of the sequence of operations corresponds to transmission of a plurality of application programming interface (API) calls to an Internet Protocol (IP) address of the storage cluster;
receiving a plurality of responses from the storage cluster based on the transmitted plurality of API calls, the received plurality of responses comprises information associated with the set of resources;
generating a dependency map between the set of resources associated with the storage cluster based on the received information; and
outputting the generated dependency map.

\* \* \* \* \*